(12) United States Patent
Lee et al.

(10) Patent No.: US 9,820,334 B2
(45) Date of Patent: Nov. 14, 2017

(54) APPARATUS AND METHOD FOR REQUESTING BANDWIDTH AND ALLOCATING UPLINK RESOURCES BASED ON GROUP IN WIRELESS COMMUNICATION SYSTEM

(75) Inventors: Ok-Seon Lee, Suwon-si (KR); Jong-Hyung Kwon, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1768 days.

(21) Appl. No.: 12/154,910

(22) Filed: May 28, 2008

(65) Prior Publication Data
US 2008/0298318 A1    Dec. 4, 2008

(30) Foreign Application Priority Data
May 28, 2007    (KR) .............................. 2007-0051392

(51) Int. Cl.
| | |
|---|---|
| *H04W 88/08* | (2009.01) |
| *H04W 76/02* | (2009.01) |
| *H04W 28/24* | (2009.01) |
| *H04W 72/00* | (2009.01) |
| *H04W 28/16* | (2009.01) |
| *H04W 72/04* | (2009.01) |

(52) U.S. Cl.
CPC .......... *H04W 88/08* (2013.01); *H04W 28/24* (2013.01); *H04W 76/021* (2013.01); *H04W 28/16* (2013.01); *H04W 72/005* (2013.01); *H04W 72/0413* (2013.01)

(58) Field of Classification Search
None
See application file for complete search history.

(56) References Cited

U.S. PATENT DOCUMENTS

| | | | |
|---|---|---|---|
| 2006/0039319 A1* | 2/2006 | Lee et al. ....................... | 370/328 |
| 2008/0153504 A1* | 6/2008 | Bourlas et al. ............ | 455/452.1 |
| 2008/0267085 A1* | 10/2008 | Bae et al. ..................... | 370/252 |
| 2009/0116434 A1* | 5/2009 | Lohr et al. ................... | 370/329 |

FOREIGN PATENT DOCUMENTS

| | | |
|---|---|---|
| EP | 0 841 763 A1 | 5/1998 |
| KR | 10-2006-0039804 | 5/2006 |
| WO | WO 98/37706 A2 | 8/1998 |

OTHER PUBLICATIONS

International Search Report dated Sep. 30, 2008 in connection with PCT Patent Application No. PCT/KR2008/002943.
Korean Office Action dated Aug. 23, 2013 in connection with Korean Patent Application No. 10-2007-0051392, 10 pages.

* cited by examiner

*Primary Examiner* — Raj Jain

(57) ABSTRACT

An apparatus and a method for allocating resources in a wireless communication system are provided. The method includes when one or more Connection IDentifiers (CIDs) request UpLink (UL) resources, checking the UL resources requested by the CIDs; and requesting the UL resources requested by the CIDs to a base station at a time.

15 Claims, 9 Drawing Sheets

| HT=1(1BIT) | EC=0(1BIT) | TYPE=1(1BIT) | BR CID MAP (nBITS) (700) | | BR MSB (13-nBITS) (710-1) |
|---|---|---|---|---|---|
| BR LSB (8BITS) (710-2) | | | | CID MSB (8BITS) (720-1) | |
| CID LSB (8BITS) (720-2) | | | | HCS (8BITS) (730) | |

FIG.7A (740)

| HT=1(1BIT) | EC=0(1BIT) | TYPE=1(1BIT) | GRP ind.(1BIT) | BR CID MAP (nBITS) (750) | BR MSB (12-nBITS) (760-1) |
|---|---|---|---|---|---|
| BR LSB (8BITS) (760-2) | | | | CID MSB (8BITS) (770-1) | |
| CID LSB (8BITS) (770-2) | | | | HCS (8BITS) (780) | |

FIG.7B

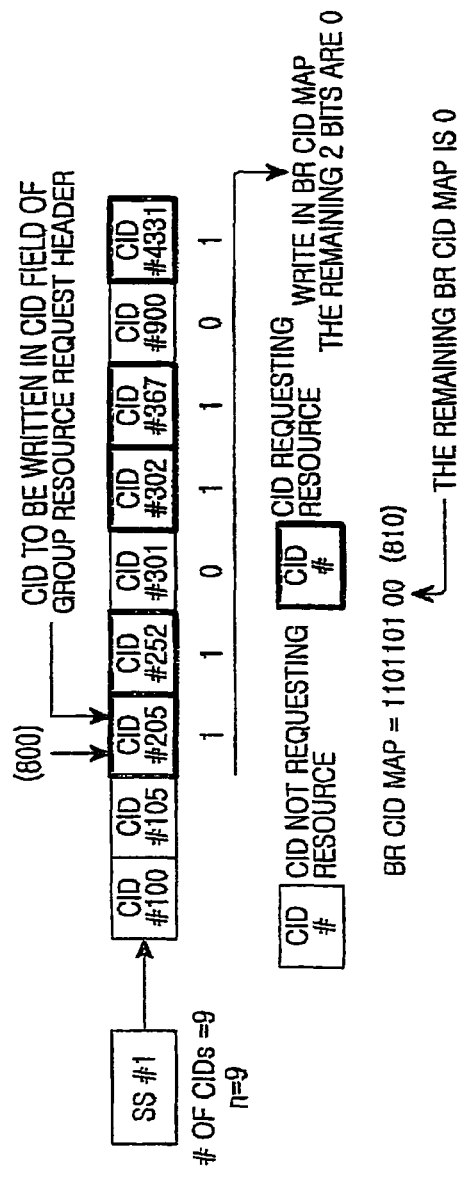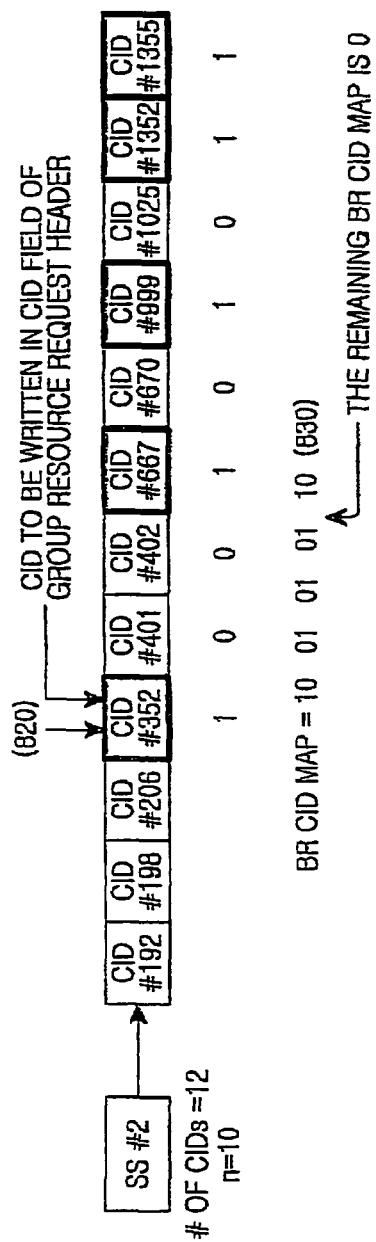
FIG.8A
FIG.8B

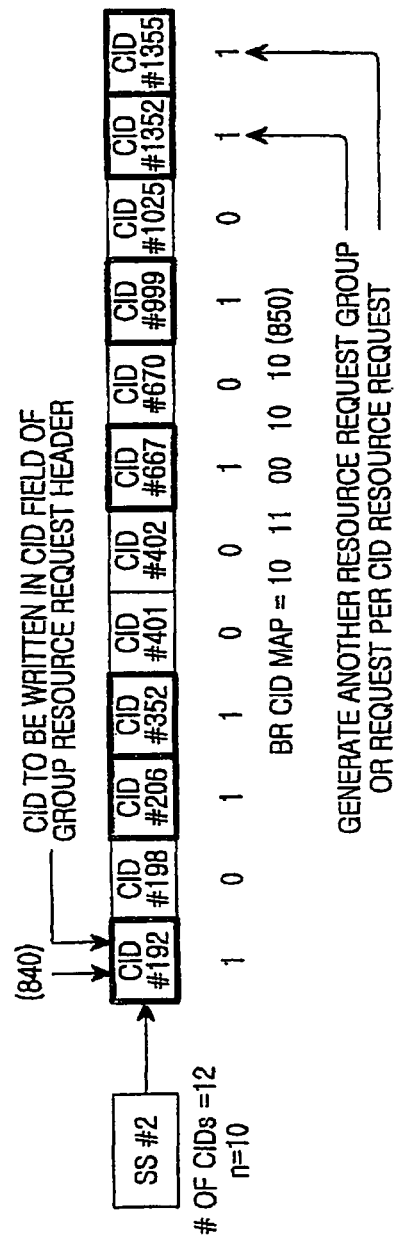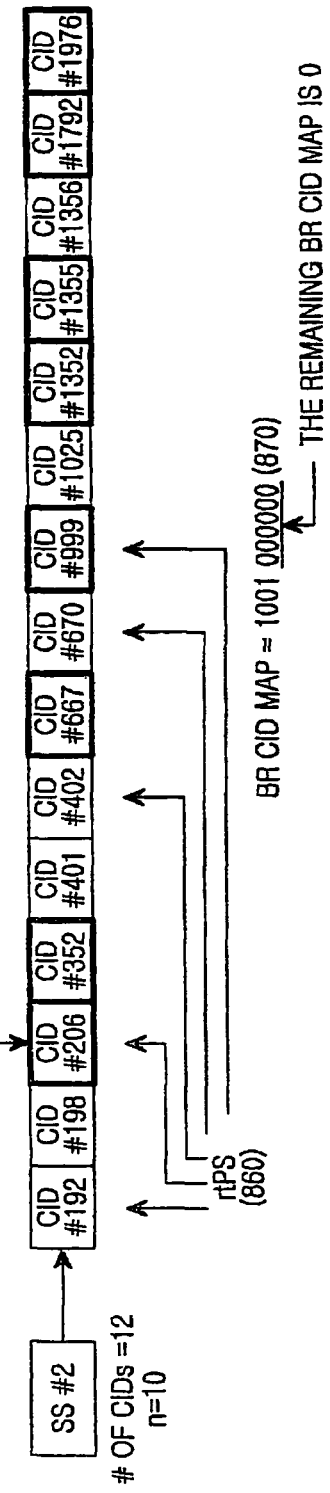
FIG.8C
FIG.8D

US 9,820,334 B2

APPARATUS AND METHOD FOR REQUESTING BANDWIDTH AND ALLOCATING UPLINK RESOURCES BASED ON GROUP IN WIRELESS COMMUNICATION SYSTEM

CROSS-REFERENCE TO RELATED APPLICATION(S) AND CLAIM OF PRIORITY

This application claims the benefit under 35 U.S.C. §119 (a) of a Korean patent application filed in the Korean Intellectual Property Office on May 28, 2007 and assigned Serial No. 2007-51392, the entire disclosure of which is hereby incorporated by reference.

TECHNICAL FIELD OF THE INVENTION

The present invention relates generally to an apparatus and a method for requesting uplink resources in a wireless communication system. More particularly, the present invention relates to an apparatus and a method for reducing an overhead in the uplink resource request in the wireless communication system. Herein, the uplink resource indicates an uplink bandwidth for sending an uplink signal.

BACKGROUND OF THE INVENTION

A wireless communication system uses limited resources. To raise the resource utilization, the wireless communication system allocates the resources to various services through a scheduling. For example, when terminals request UpLink (UL) resources, a base station of the wireless communication system schedules and allocates UL resources to the terminals by taking into account the UL resources requested by the terminals.

To get the necessary UL resources, the terminal requests the UL resources to the base station. The terminal requests the UL resources per Connection IDentifier (CID).

Accordingly, when using a plurality of CIDs based on a class of Quality of Service (QoS), the terminal constitutes a bandwidth request header on the CID basis requiring the UL resources and then transmits the bandwidth request header to the base station.

The terminal requests the UL resource to the base station through a periodic polling. In other words, the terminal constitutes the bandwidth request header on the CID basis by the polling periods and transmits it to the base station.

For example, the terminal uses a bandwidth request header of FIG. 1 as defined by the Institute of Electrical and Electronics Engineers (IEEE) 802.16 standard to request the UL resource.

FIG. 1 illustrates a conventional header for requesting the UL resource in a wireless communication system.

The bandwidth request header of FIG. 1 includes a Header Type (HT) field, an Encryption Control (EC) field, a type field, a Bandwidth Request (BR) field 100, a CID field 110, and a Header CheckSum (HCS) field 120. The HT field, the EC field, and the type field signify that the bandwidth request header is a UL bandwidth request header.

The BR field 100 indicates an amount of the UL resources requested by the CID of the terminal.

The CID field 110 carries CID information of the service requesting the UL resource through the BR field 100.

The HCS field 120 carries information for checking error of the bandwidth request header.

When the terminals request the UL resource on the CID basis, the base station checks the amount of the UL resources requested by the terminal using the bandwidth request headers received from the terminals on the CID basis. Next, the base station allocates UL resources to the terminals through the scheduling. Although the terminals request the UL resource on the CID basis, the base station allocates the UL resources on the terminal basis.

As discussed above, the terminals request the UL resources on the CID basis by the polling periods. The base station can accomplish the efficient resource allocation while meeting the Quality of Service (QoS) of the CIDs of the terminals.

However, since the terminals request the resources on the CID basis, the amount of the UL resources allocated for the bandwidth request headers by the polling periods increases in proportion to the number of the CIDs.

Also, if the terminal does not request the bandwidth by the set polling periods in the wireless communication system, the UL resource allocated for the bandwidth request of the terminal is wasted away.

SUMMARY OF THE INVENTION

To address the above-discussed deficiencies of the prior art, it is a primary object of the present invention to address at least the above mentioned problems and/or disadvantages and to provide at least the advantages described below. Accordingly, an aspect of the present invention is to provide an apparatus and a method for reducing an overhead in a UL resource request in a wireless communication system.

Another aspect of the present invention is to provide an apparatus and a method for reducing an overhead in a UL resource request and guaranteeing a minimum QoS of CIDs in a wireless communication system.

Yet another aspect of the present invention is to provide an apparatus and a method for reducing an overhead in a UL resource request and requesting UL resources by grouping CIDs requesting the UL resources to guarantee a minimum QoS of the CIDs in a wireless communication system.

Still another aspect of the present invention is to provide an apparatus and a method for reducing an overhead in a UL resource request and requesting UL resources by grouping CIDs requesting the UL resources based on a QoS class to guarantee a minimum QoS of the CIDs in a wireless communication system.

The above aspects are achieved by providing a method for requesting resources at a terminal in a wireless communication system. The method includes when one or more Connection IDentifiers (CIDs) request UpLink (UL) resources, checking the UL resources requested by the CIDs; and requesting the UL resources requested by the CIDs to a base station at a time.

According to one aspect of the present invention, a method for allocating resources in a wireless communication system includes when receiving a resource request message from a terminal, confirming one or more CIDs which request UL resources, and the UL resources requested by the CIDs in the resource request message; checking whether to allocate the resources requested by the CIDs; and when it is possible to allocate the resources requested by the CIDs, allocating UL resources to terminals of the CIDs.

According to another aspect of the present invention, a terminal in a wireless communication system includes a scheduler for, when one or more CIDs request UL resources, grouping the CIDs as at least one group and generating a resource request message which comprises resources requested by the CIDs based on the group; and a transmitter for transmitting the resource request message to a base station.

According to yet another aspect of the present invention, a base station in a wireless communication system includes a receiver for receiving a resource request message; and a scheduler for confirming one or more CIDs which request UL resources and the UL resources requested by the CIDs in the resource request message, and allocating UL resources to terminals of the CIDs through a scheduling.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 7A and 7B illustrate headers for requesting the UL resources in the wireless communication system according to an exemplary embodiment of the present invention; and FIGS. 8A to 8D illustrate bitmap constitutions of CIDs requesting the resources when the UL resources are requested on the group basis in the wireless communication system according to an exemplary embodiment of the present invention.

DETAILED DESCRIPTION OF THE INVENTION

FIGS. 2 through 8D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention provides a technique for reducing an overhead in an UpLink (UL) resource request in a wireless communication system. Herein, the UL resources include a UL bandwidth.

Hereinafter, a wireless communication system using Orthogonal Frequency Division Multiple Access (OFDMA) is illustrated by way of example. Note that the present invention is applicable to any other wireless communication systems.

A terminal in the wireless communication system can have a plurality of Connection IDentifiers (CIDs) per Quality of Service (QoS) class. When the multiple CIDs request resources, the terminal groups the resource requesting CIDs to reduce an overhead in the UL resource request and then requests the necessary UL resources to a base station at a time. For instance, the terminal requests the UL resources when a UL resource request period (e.g., a polling period) arrives. Herein, the CID indicates a transport CID.

The terminal groups its CIDs as one group or based on the QoS class. The terminal can group the CIDs on other different bases. The terminal may determine the CID grouping method in an initial network configuration phase or in the UL resource request.

Now, terminal's operations for requesting the UL resources in the wireless communication system are explained. The terminal groups the CIDs requesting the resources and then requests the necessary UL resources at a time as shown in FIG. 2.

Figure 2:
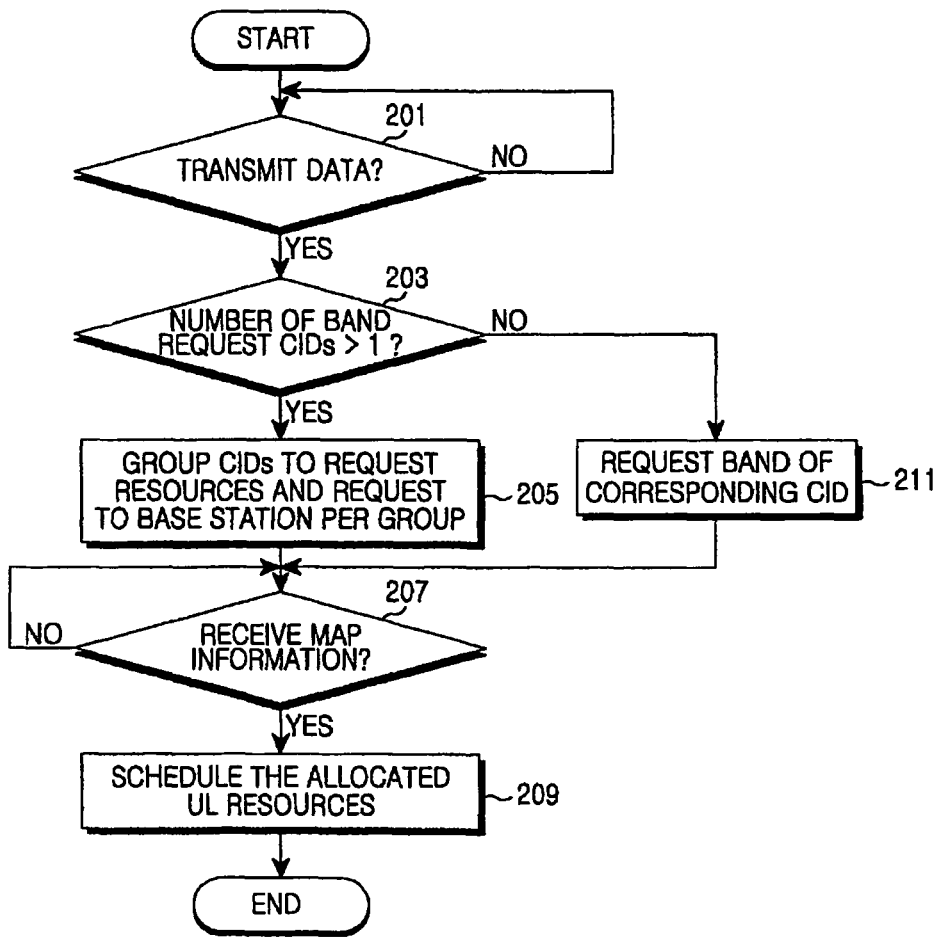
FIG. 2 illustrates a method for a terminal to request UL resources in a wireless communication system according to an exemplary embodiment of the present invention.

FIG. 2 illustrates a method for the terminal to request UL resources in a wireless communication system according to an exemplary embodiment of the present invention.

In step 201, the terminal checks whether there is UL data to be transmitted.

When there exists the UL data to be transmitted, the terminal checks the number of CIDs requesting the UL resources to deliver the UL data in step 203.

When there is a plurality of CIDs requesting the resources (the number of the resource requesting CIDs>1), the terminal groups the resource requesting CIDs and requests the UL resources based on the group to a base station at a time in step 205. When a UL resource request period arrives, the terminal requests the necessary UL resources to the base station. For instance, the terminal groups its CIDs as one group. Next, the terminal generates a bandwidth request header including information of the UL resources requested by the CIDs of the group and transmits the bandwidth request header to the base station. The terminal can constitute the bandwidth request header as shown in FIGS. 7A and 7B.

Alternatively, the terminal groups its CIDs based on the QoS class. Next, the terminal generates a bandwidth request header including information of the UL resources requested by the CIDs of each group and transmits the bandwidth request header to the base station. The terminal can constitute the bandwidth request header as shown in FIGS. 7A and 7B.

Figure 1:
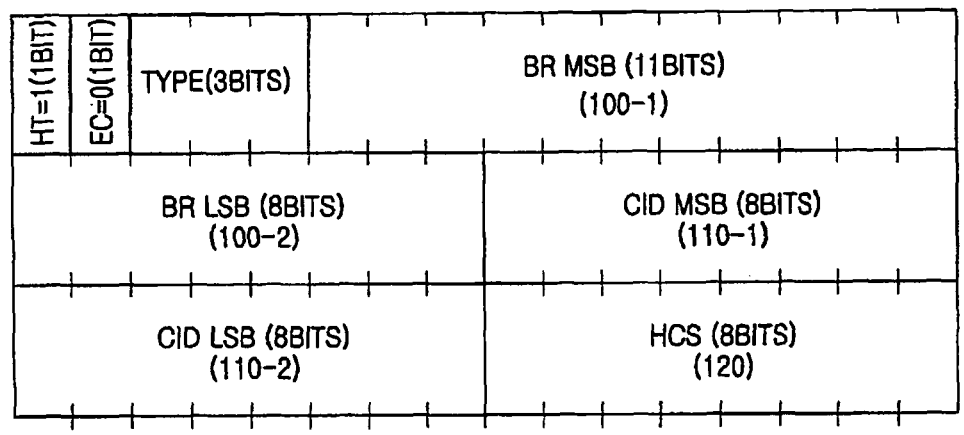
FIG. 1 illustrates a conventional header for requesting UL resources in a wireless communication system.

By contrast, when there is only one CID requesting the resource in step 203, the terminal requests the UL resources requested by the CID to the base station in step 211. When the UL resource request period comes, the terminal requests the necessary UL resources to the base station. For instance, the terminal generates a bandwidth request header including information of the UL resources requested by the CID and transmits the bandwidth request header to the base station. The terminal can constitute the bandwidth request header as shown in FIG. 1 or FIGS. 7A and 7B.

After requesting the UL resources to the base station in step 205 or step 211, the terminal checks whether resource allocation information is received from the base station in step 207. That is, the terminal checks whether a UL MAP is received from the base station.

When receiving the UL MAP, the terminal confirms UL resources allocated from the base station based on the UL MAP and the terminal transmits the UL data to the base station by scheduling the allocated resources in step 209.

Next, the terminal finishes this process.

When the multiple CIDs request the UL resources as above, the terminal groups the CIDs and requests the UL resources of the CIDs of the group to the base station at a time. Yet, when a time delay of the CID of the real-time service is greater than a reference time, the terminal solely requests the UL resources to the base station without grouping the CIDs. When the time delay of the CID of the real-time service is less than the reference time, the terminal groups the CIDs and then requests the UL resources.

The UL resource request period of the terminal can be determined per CID. Hence, when the resource requesting CIDs are grouped, the UL resource request period can be set to the shortest UL resource request period of the CID among the grouped CIDs.

Depending on the UL resource request period of the terminal, a next scheduled UL resource request chance may be cancelled under the control of the base station.

Now, the bandwidth request header for requesting the UL resource at the terminal is described in detail. Hereafter, the bandwidth request header employs a frame header defined in Media Access Control (MAC) signaling header type II of the IEEE 802.16 standard. That is, the bandwidth request header can be constituted using a reserved area of the type field '1' in the MAC signaling header type II.

FIGS. 7A and 7B illustrate headers for requesting the UL resource in the wireless communication system according to an exemplary embodiment of the present invention.

FIG. 7A depicts a basic structure of the bandwidth request header and FIG. 7B depicts a bandwidth request header for selectively using the grouping scheme.

The bandwidth request header of FIG. 7A includes a Header Type (HT) field, an Encryption Control (EC) field, a type field, a Bandwidth Request (BR) CID MAP field 700, a Bandwidth Request (BR) field 710, a CID field 720, and a Header CheckSum (HCS) field 730. Since the bandwidth request header employs the frame header defined in the MAC signaling header type II of the IEEE 802.16 standard, the HT field is set to 1 and the EC field is set to zero.

The type field indicates that the head request header uses a CID bitmap.

The BR CID MAP field 700 contains information of CIDs which request the resource using the bandwidth request header, among the CIDs of the terminal having a multi-connection. The BR CID MAP field 700 constitutes the information of the resource requesting CIDs as a bitmap. Since the base station to which the terminal requests the UL resources, knows QoS class based CID information of the terminal, the BR CID MAP field 700 can be constituted as the bitmap.

The size of the BR CID MAP field 700 can be defined using Equation (1).

$$n = \min(M, \text{total CIDs number}) \qquad (1)$$

n indicates the size of the BR CID MAP field 700, M indicates the maximum number of bits usable by the BR CID MAP field 700, and total CIDs number indicates the number of CIDs of the terminal. M is determined based on a minimum size of the BR field 710. For example, as the BR field 710 uses 11 bits minimum according to the IEEE 802.16 standard, M of FIG. 7A can be 10 and M of FIG. 7B can be 9.

As expressed in Equation (1), the size of the BR CID MAP field 700 is determined depending on the number of the CIDs of the terminal. For instance, when the number of the CIDs of the terminal is smaller than M, the size of the BR CID MAP field 700 equals the number of the CIDs. When the number of the CIDs of the terminal is greater than M, the size of the BR CID MAP field 700 equals M.

The BR field 710 contains information of the sum of the UL resources required by the CIDs requesting the UL resources using the bandwidth request header.

The CID field 720 contains information of the first CID among the CIDs requesting the UL resources using the bandwidth request header. That is, the CID field 720 contains the information of the first CID requesting the resource among the CIDs in the BR CID MAP field 700. The base station is aware of the information of the CIDs of the terminal. Hence, the base station can identify the terminal and the requesting CIDs of which the UL resource information is delivered by the bandwidth request header, based on the BR CID MAP field 700 and the CID information of the CID field 720.

The HCS field 730 contains information for checking error of the bandwidth request header.

The bandwidth request header of FIG. 7A includes no field indicative of the grouping scheme of the CIDs. Thus, the base station and the terminal determine the grouping scheme of the CIDs which request the UL resources in the initial system deployment phase.

The bandwidth request header of FIG. 7B includes a HT field, an EC field, a type field, a group indicator field 740, a BR CID MAP field 750, a BR field 760, a CID field 770, and a HCS field 780. Since the head request header employs the frame header defined in the MAC signaling header type II of the IEEE 802.16 standard, the HT field is set to 1 and the EC field is set to zero.

The type field indicates that the bandwidth request header uses the CID bitmap.

The group indicator field 740 indicates the grouping scheme of the CIDs requesting the resources at the terminal which generates the bandwidth request header. For example, when the group indicator field 740 is zero, the terminal groups its CIDs as one group and generates a bandwidth request header for the one group. When the group indicator field 740 is 1, the terminal groups the CIDs per QoS class and generates a bandwidth request header for each group.

The BR CID MAP field 750 contains information of CIDs requesting the resources among the CIDs of the terminal having the multi-connection. The BR CID MAP field 750 constitutes the information of the resource requesting CIDs as a bitmap. Since the base station, to which the terminal requests the UL resources, knows QoS class based CID information of the terminal, the BR CID MAP field 750 can be constituted as a bitmap.

The size of the BR CID MAP field 750 is determined by the number of the CIDs of the terminal as expressed in Equation (1).

The BR field 760 contains information of the sum of the UL resources required by the CIDs which request the UL resources using the bandwidth request header.

The CID field 770 contains information of the first CID among the CIDs requesting the UL resources using the bandwidth request header. That is, the CID field 770 contains the information of the first CID requesting the resource among the CIDs contained in the BR CID MAP field 750. The base station is aware of the information of the CIDs of each terminal. Hence, the base station can identify the terminal and the requesting CIDs of which the UL resource information is delivered by the bandwidth request header, based on the BR CID MAP field 750 and the CID information of the CID field 770.

The HCS field 780 contains information for checking error of the bandwidth request header.

Hereafter, a method for the terminal to constitute the BR CID MAP field of the bandwidth request header is illustrated in detail. By way of example, the terminal constitutes the BR CID MAP field as shown in FIGS. 8A to 8D.

FIGS. 8A to 8D illustrate the bitmap constitutions of the CIDs requesting the resources when the UL resources are requested on the group basis in the wireless communication system according to an exemplary embodiment of the present invention. It is assumed that the maximum size of the BR CID MAP field is 10.

FIGS. 8A, 8B and 8C depict the constitution of the BR CID MAP field when the CIDs are grouped as one group. FIG. 8D depicts the constitution of the BR CID MAP field when the CIDs are grouped based on the QoS class. More particularly, in FIG. 8A, the number of the CIDs of the terminal is smaller than the maximum size of the BR CID MAP field. In FIGS. 8B and 8C, the number of the CIDs of the terminal is greater than the maximum size of the BR CID MAP field.

When the terminal 1 (ss #1) has nine CIDs in FIG. 8A, the BR CID MAP field 810 for the terminal 1 to request the UL resources is 9 bits in size according to Equation (1).

When CIDs #205, #252, #302, #367, and #4331 of the CIDs of the terminal 1 request the UL resources, the terminal 1 represents the CIDs starting from #205, which is the first CID requesting the UL resource, in the BR CID MAP field 810. As representing from the first CID 800 in the BR CID MAP field 810, the terminal 1 marks the remaining two bits as zero. Herein, in the BR CID MAP field 810, 1 indicates the CID requesting the resource and zero indicates the CID not requesting the resource.

When the terminal 2 (ss #2) has twelve CIDs in FIG. 8B, the BR CID MAP field 830 for the terminal 2 to request the UL resources is 10 bits in size according to Equation (1).

When CIDs #352, #667, #999, #1352, and #1355 of the CIDs of the terminal 2 request the UL resources, the terminal 2 represents the CIDs starting from #352, which is the first CID requesting the UL resource, in the BR CID MAP field 830.

When the BR CID MAP field 830 is constructed, the number of the CIDs of the terminal 2 is greater than the number of the CIDs representable in the BR CID MAP field 830. Hence, the BR CID MAP field 830 of one bandwidth request header can not represent all the CIDs requesting the UL resources of the terminal 2.

Yet, the terminal 2 represents the CIDs starting from the first CID 820 in the BR CID MAP field 830. Since three CIDs prior to the first CID 820 are excluded, the terminal 2 can represent all the CIDs requesting the resource, in the 10-bit BR CID MAP field 830. As the CIDs starting from the first CID 820 are represented in the BR CID MAP field 830, the terminal 2 marks the remaining 1 bit as zero. In the BR CID MAP field 830, 1 indicates the CID requesting the resource and zero indicates the CID not requesting the resource.

When the terminal 2 (ss #2) has twelve CIDs in FIG. 8C, the BR CID MAP field 850 for the terminal 2 to request the UL resources is 10 bits in size according to Equation (1).

When CIDs #192, #206, #352, #667, #999, #1352, and #1355 of the CIDs of the terminal 2 request the UL resources, the terminal 2 represents from #192, which is the first CID requesting the UL resource, in the BR CID MAP field 850.

When the BR CID MAP field 850 is constructed, the number of the CIDs of the terminal 2 is greater than the number of the CIDs representable in the BR CID MAP field 850. Hence, the BR CID MAP field 850 of one bandwidth request header can not represent all the CIDs requesting the UL resources of the terminal 2. Thus, the terminal 2 can request the UL resources by generating another bandwidth request header for #1352 and #1355 not represented in the BR CID MAP field 850. Alternatively, the terminal 2 can request the UL resources by generating a bandwidth request header for #1352 and #1355 each as shown in FIG. 1.

When there are five CIDs of which QoS class is rtPS among the CIDs of the terminal 2 (ss #2) in FIG. 8D, the terminal 2 constitutes the BR CID MAP field 870 by grouping the CIDs of the rtPS QoS class.

When CIDs #206, #352, #667, #999, #1352, #1355, #1792, and #1976 of the CIDs of the terminal 2 request the UL resources, the terminal 2 constitutes the BR CID MAP field 870 for the CIDs included to the rtPS QoS class.

In doing so, the terminal 2 represents from the first CID 860, #206, requesting the UL resource of the CIDs included to the rtPS QoS class, in the BR CID MAP field 870. The terminal 2 represents only the CIDs included to the rtPS QoS class in the BR CID MAP field 870.

As above, constituting the BR CID MAP field, the terminal represents its CIDs starting from the CID requesting the UL resource in the BR CID MAP field. Alternatively, the terminal may represent its CIDs starting from the first CID in the BR CID MAP field.

Now, descriptions provide operations of the base station for allocating the UL resources to the terminal according to the UL resource information requested by the terminal in the wireless communication system. As an example, the base station allocates the UL resource as shown in FIG. 3 or FIG. 4.

Figure 3:
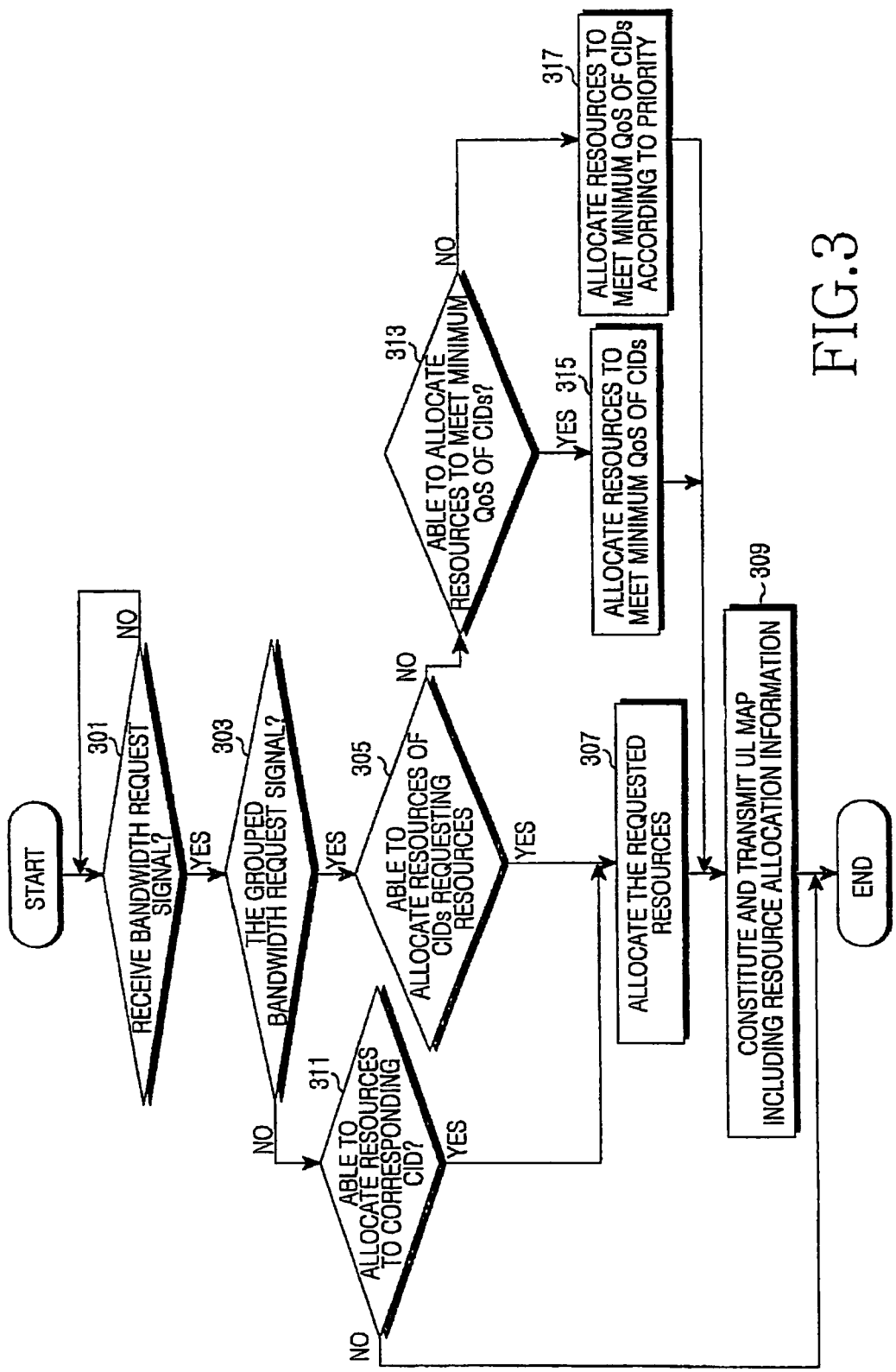
FIG. 3 illustrates a method for a base station to allocate UL resources in the wireless communication system according to an exemplary embodiment of the present invention.
Figure 4:
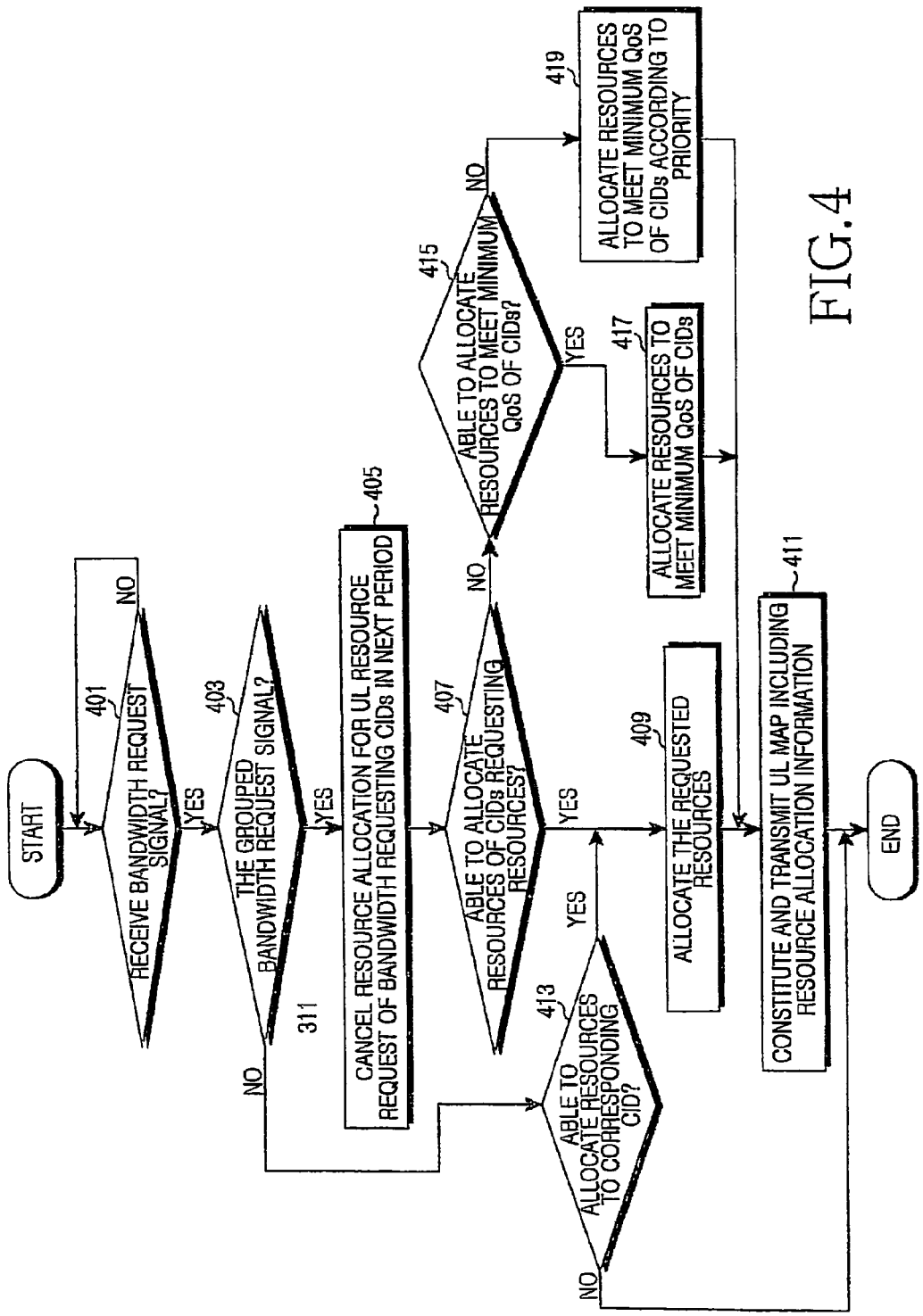
FIG. 4 illustrates a method for a base station to allocate UL resources in the wireless communication system according to another exemplary embodiment of the present invention.

FIG. 3 illustrates a method for the base station to allocate UL resources in the wireless communication system according to an exemplary embodiment of the present invention.

In step 301, the base station checks whether resource request signals are received from terminals.

When receiving the resource request signals, the base station checks whether the resource request signal includes UL resource information requested by the grouped CIDs in step 303. That is, the base station checks whether a bandwidth request header including the UL resource information requested by the grouped CIDs is received from the terminal.

When the resource request signal is a bandwidth request header including the UL resource information requested by one CID, the base station checks whether it is possible to allocate the UL resource requested by the CID in step 311.

When it is possible to allocate the resources requested by the CID, the base station allocates the UL resources to the CID through the scheduling by taking into account the UL resources requested by the CID in step 307. As allocating the UL resources per terminal, the base station allocates the UL resource to the terminal having the CID.

By contrast, when it is infeasible to allocate the resources requested by the CID in step 311, the base station finishes this process. Since not allocating the resources as requested by the CID, the base station can know the lacking UL resource of the terminal having the CID. Although it is not illustrated, in a next scheduling period, the base station may allocate the lacking UL resources to the terminal.

When the resource request signal is a bandwidth request header including UL resource information requested by the grouped CIDs in step 303, the base station checks whether it can allocate the UL resources requested by the grouped CIDs based on the bandwidth request header in step 305. For example, the base station confirms the terminal which sent the bandwidth request header, based on CID information in the CID field of the bandwidth request header. Also, the base station confirms the CIDs requesting the UL resources among the CIDs of the terminal, based on the BR CID MAP field of the bandwidth request header. The base station can get the sum of the resources requested by the CIDs, from the BR field of the bandwidth request header. After confirming the CIDs requesting the UL resources and the amount of the UL resources requested by the CIDs, the base station checks whether it can allocate the UL resources as requested by the CIDs.

When it is possible to allocate the resources requested by the CIDs, the base station allocates the UL resources to the CIDs through the scheduling by taking into account the UL resources requested by the CIDs in step 307. As allocating the UL resources per terminal, the base station allocates the UL resources to the terminal of the CIDs.

By contrast, when it is infeasible to allocate the resources requested by the CIDs in step 305, the base station checks whether the resources can be allocated to meet a minimum QoS of the CIDs requesting the resources in step 313. The base station can acquire QoS requirements of the CIDs through QoS parameters agreed in a DSx process such as Dynamic Service Addition (DSA) and Dynamic Service Control (DSC). Herein, the QoS parameters include a minimum data rate for the service of the CIDs, a maximum time delay, a priority, a scheduling type (QoS class), a resource request scheme, a retransmission scheme, and so forth.

When it is feasible to allocate the resources which meet the minimum QoS of the CIDs, the base station allocates the resources to meet the minimum QoS of the CIDs through the scheduling in step 315. As allocating the resources per terminal, the base station allocates the UL resources to the terminal of the CIDs. Because the base station cannot allocate all the resources requested by the CIDs, the lacking UL resource of the terminal of the CIDs can be identified. Although it is not illustrated, in a next scheduling period, the base station may allocate the lacking UL resources to the terminal.

By contrast, when it is infeasible to allocate the resources to meet the minimum QoS of the CIDs in step 313, the base station assigns the resources to meet the minimum QoS to the resource-requesting CIDs starting from the CID of the highest priority in step 317. According to the QoS parameters of the CID agreed in the DSx process, the base station allots the resources to meet the minimum QoS to the CIDs starting from the CID of the highest priority. As assigning the UL resources per terminal, the base station allocates the UL resources to the terminal of the CIDs.

Because the base station cannot allocate all the resources requested by the CIDs, the lacking UL resource of the terminal of the CIDs can be identified. Although it is not illustrated, in a next scheduling period, the base station may allocate the lacking UL resources to the terminal.

In step 309, the base station constitutes UL MAP including the information of the resources allocated to the terminals and transmits the UL MAP to the terminals.

Next, the base station finishes this process.

FIG. 4 illustrates a method for the base station to allocate UL resources in the wireless communication system according to another exemplary embodiment of the present invention.

In step 401, the base station checks whether resource request signals are received from terminals.

When receiving the resource request signals, the base station checks whether the resource request signal includes UL resource information requested by the grouped CIDs in step 403. That is, the base station checks whether a bandwidth request header including UL resource information requested by the grouped CIDs is received from the terminals.

When the resource request signal is a bandwidth request header including the UL resource information requested by one CID, the base station checks whether it is able to allocate the UL resources requested by the CID in step 413.

When it can allocate the resources requested by the CID, the base station allocates the UL resource to the CID through the scheduling by taking into account the UL resources requested by the CID in step 409. As allocating the UL resources per terminal, the base station allocates the UL resources to the terminal including the CID.

By contrast, when it is infeasible to allocate the resources requested by the CID in step 413, the base station finishes this process. Since not allocating the resources as requested by the CID, the base station can know the lacking UL resources of the terminal including the CID. Although it is not illustrated, in a next scheduling period, the base station may allocate the lacking UL resources to the terminal.

When the resource request signal is a bandwidth request header including UL resource information requested by the grouped CIDs in step 403, the base station cancels the UL resource request chance periodically allocated to the terminal which requests the UL resources using the bandwidth request header in step 405. In doing so, the base station cancels only the next opportunity of the terminal which requests the UL resources using the bandwidth request header, according to the UL resource request period.

In step 407, the base station checks whether it can allocate the UL resources requested by the grouped CIDs using the bandwidth request header. For example, the base station identifies the terminal which sent the bandwidth request header, based on CID information in the CID field of the bandwidth request header. Also, the base station identifies the CIDs requesting the UL resources among the CIDs of the terminal, based on the BR CID MAP field of the bandwidth request header. The base station can get the sum of the resources requested by the CIDs, from the BR field of the bandwidth request header. After confirming the CIDs requesting the UL resources and the amount of the UL resources requested by the CIDs, the base station checks whether it can allocate the UL resources as requested by the CIDs.

When it is possible to allocate the resources requested by the CIDs, the base station allocates the UL resources to the CIDs through the scheduling by taking into account the UL resources requested by the CIDs in step 409. As allocating the UL resources per terminal, the base station allocates the UL resources to the terminal of the CIDs.

By contrast, when it is infeasible to allocate the resources requested by the CIDs in step 407, the base station checks whether the resources can be allocated to meet a minimum QoS of the CIDs requesting the resources in step 415.

When it is feasible to allocate the resources which meet the minimum QoS of the CIDs, the base station allocates the resources to meet the minimum QoS of the CIDs through the scheduling in step 417. As allocating the resources per terminal, the base station allocates the UL resources to the terminal of the CIDs. Because the base station cannot allocate all the resources requested by the CIDs, the lacking UL resource of the terminal of the CIDs can be identified. Although it is not illustrated, in a next scheduling period, the base station may allocate the lacking UL resources to the terminal.

By contrast, when it is infeasible to allocate the resources to meet the minimum QoS of the CIDs in step 415, the base station assigns the resource to meet the minimum QoS to the resource-requesting CIDs starting from the CID of the highest priority in step 419. According to the QoS parameters of the CID agreed in the DSx process, the base station assigns the resources to meet the minimum QoS to the CIDs starting from the CID of the highest priority. As assigning the UL resources per terminal, the base station allocates the UL resources to the terminal of the CIDs.

Because the base station cannot allocate all the resources requested by the CIDs, the lacking UL resource of the terminal of the CIDs can be identified. Although it is not illustrated, in a next scheduling period, the base station may allocate the lacking UL resources to the terminal.

In step 411, the base station constitutes UL MAP including the information of the resources allocated to the terminals and transmits the UL MAP to the terminals.

Next, the base station finishes this process.

Now, a structure of the terminal is explained, which groups the CIDs requesting the UL resources and requests the UL resources to the base station in the wireless communication system.

Figure 5:
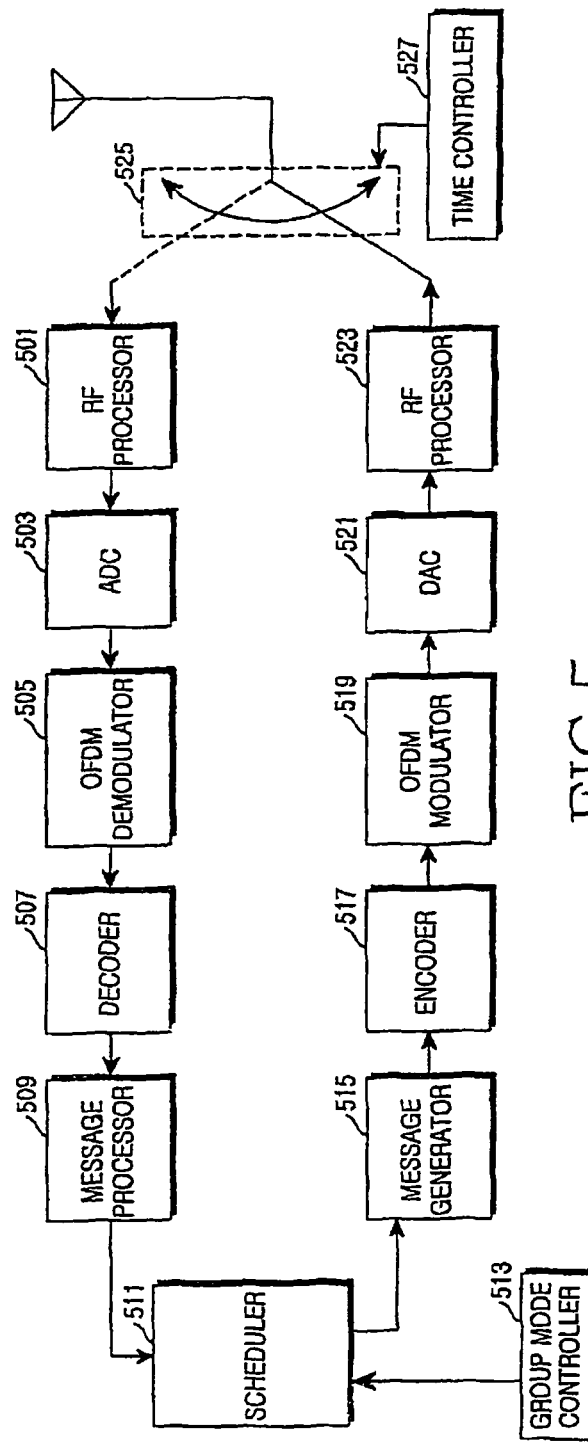
FIG. 5 illustrates the terminal in the wireless communication system according to an exemplary embodiment of the present invention.

FIG. 5 is a block diagram of the terminal in the wireless communication system according to an exemplary embodiment of the present invention.

The terminal of FIG. 5 includes a Radio Frequency (RF) processor 501, an Analog to Digital Converter (ADC) 503, an Orthogonal Frequency Division Multiplexing (OFDM) demodulator 505, a decoder 507, a message processor 509, a scheduler 511, a group mode controller 513, a message generator 515, an encoder 517, an OFDM modulator 519, a Digital to Analog Converter (DAC) 521, an RF processor 523, a switch 525, and a time controller 527.

The time controller 527 controls a switching operation of the switch 525 based on a frame synchronization. For example, in a signal Rx interval, the time controller 527 controls the switch 525 to connect an antenna to the RF processor 501 of a receiving stage. In a signal Tx interval, the time controller 527 controls the switch 525 to connect the antenna to the RF processor 523 of a transmitting stage.

In the signal Rx interval, the RF processor 501 converts an RF signal received on the antenna to a baseband analog signal. The ADC 503 converts the baseband analog signal output from the RF processor 501 to a digital signal. The OFDM demodulator 505 converts the time-domain digital signal output from the ADC 503 to a frequency-domain signal using a Fast Fourier Transform (FFT).

The decoder 507 selects data mapped to subcarriers to be actually received, from the frequency-domain data output from the OFDM demodulator 505. Next, the decoder 507 demodulates and decodes the selected data at a preset modulation level (Modulation and Coding Scheme (MCS) level).

The message processor 509 decomposes a control message output from the decoder 507 and provides the result to the scheduler 511. For instance, the message processor 509 confirms the UL resources allocated from the base station by analyzing the UL MAP of the signal received from the base station. Next, the message processor 509 provides the allocated UL resource information to the scheduler 511.

The scheduler 511 allocates the UL resources to the CIDs requesting the UL resources by scheduling the UL resources allocated from the base station.

When an UL resource request period comes, the scheduler 511 confirms the resource-requesting CIDs of the CIDs of the terminal and the amount of the requested resources. When a plurality of CIDs requests the resources, the scheduler 511, which includes a group generator not illustrated in the drawing, groups the CIDs under the control of the group mode controller 513. The group generator groups the CIDs of the terminal as one group under the control of the group mode controller 513. Alternatively, the group generator groups the CIDs of the terminal based on the QoS class under the control of the group mode controller 513.

When the multiple CIDs request the UL resources at the scheduler 511, the group mode controller 513 controls the method for grouping the CIDs. For example, the group mode controller 513 determines whether to group the CIDs of the terminal as one group or to group the CIDs based on the QoS class, and then controls the scheduler 511. When the time delay, which is taken to group the CIDs for the real-time service and to request the resources, is greater than the reference value, the group mode controller 513 controls the scheduler 511 to individually request the UL resources without grouping the CIDs.

The message generator 515 generates the bandwidth request header including the UL resource information requested by the CIDs under the control of the scheduler 511. For example, when a single CID requests the UL resources, the message generator 515 constitutes the bandwidth request header for the CID as shown in FIG. 1 or 7. When a plurality of CIDs requests the UL resources, the message generator 515 constitutes the bandwidth request header including the UL resource information requested by the CIDs of each group according to the grouping information of the CIDs provided from the scheduler 511 as shown in FIGS. 7A and 7B.

The encoder 517 encodes and modulates the signal output from the message generator 515 at the preset modulation level (MCS level).

The OFDM modulator 519 converts the frequency-domain signal output from the encoder 517 to a time-domain sample signal using Inverse FFT (IFFT).

The DAC 521 converts the sample signal output from the OFDM modulator 519 to an analog signal.

The RF processor 523 converts the baseband signal output from the DAC 521 to an RF signal and transmits the RF signal over the antenna.

As constructed above, the scheduler 511, as a protocol controller, controls the message processor 509, the message generator 515, and the group mode controller 513. Namely, the scheduler 511 can function as the message processor 509, the message generator 515, and the group mode controller 513. They are provided separately to distinguish their functions. Hence, in the actual implementation, the scheduler 511 can process all or part of the message processor 509, the message generator 515, and the group mode controller 513.

The structure of the base station is now described, which allocates the UL resources to the terminal according to the grouped resource request information in the wireless communication system.

Figure 6:
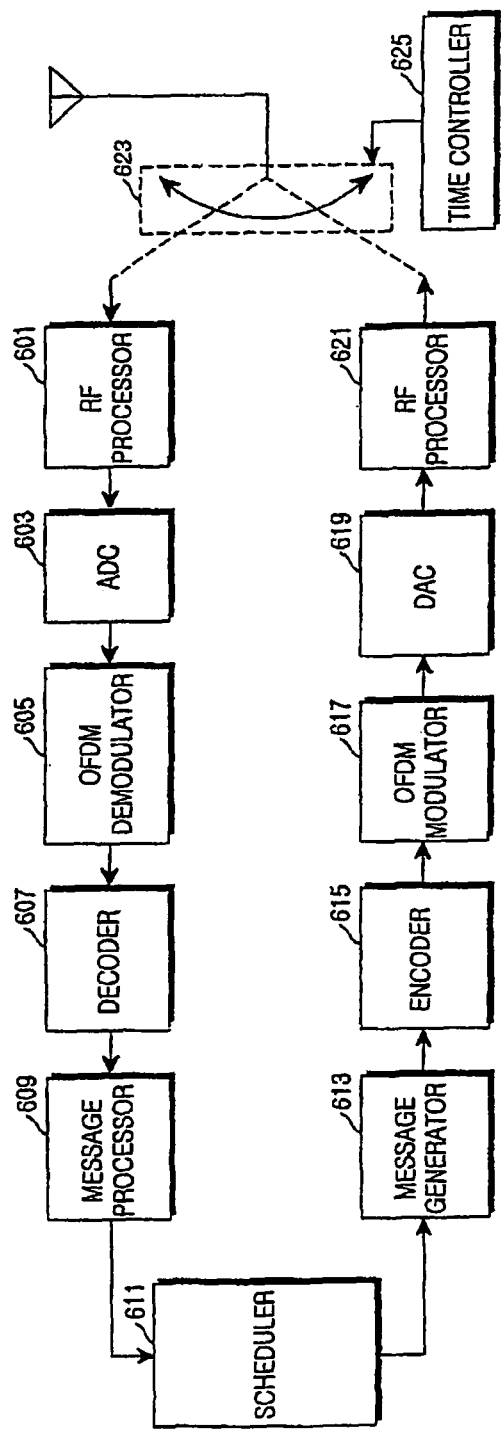
FIG. 6 illustrates the base station in the wireless communication system according to an exemplary embodiment of the present invention.

FIG. 6 is a block diagram of the base station in the wireless communication system according to an exemplary embodiment of the present invention.

The base station of FIG. 6 includes an RF processor 601, an ADC 603, an OFDM demodulator 605, a decoder 607, a message processor 609, a scheduler 611, a message generator 613, an encoder 615, an OFDM modulator 617, a DAC 619, an RF processor 621, a switch 623, and a time controller 625.

The time controller 625 controls a switching operation of the switch 623 based on a frame synchronization. For example, in a signal Rx interval, the time controller 625 controls the switch 623 to connect an antenna to the RF processor 601 of a receiving stage. In a signal Tx interval, the time controller 625 controls the switch 623 to connect the antenna to the RF processor 621 of a transmitting stage.

In the signal Rx interval, the RF processor 601 converts an RF signal received on the antenna to a baseband analog signal. The ADC 603 converts the baseband analog signal output from the RF processor 601 to a digital signal. The OFDM demodulator 605 converts the time-domain signal output from the ADC 603 to a frequency-domain signal using the FFT.

The decoder 607 selects data mapped to subcarriers to be actually received, from the frequency-domain data output from the OFDM demodulator 605. Next, the decoder 607 demodulates and decodes the selected data at a preset modulation level (MCS level).

The message processor 609 decomposes a control message output from the decoder 607 and provides the result to the scheduler 611. For instance, when receiving bandwidth request headers from the terminals, the message processor 609 confirms the CID of bandwidth request header and the amount of the resources requested by the CID and provides the confirmed CID and resource amount to the scheduler 611. When receiving a bandwidth request header including resource information requested by the grouped CIDs from the terminals, the message processor 609 confirms the CIDs requesting the resources using the bandwidth request header and the amount of the resources requested by the CIDs, and provides the confirmed CIDs and the confirmed resource amount to the scheduler 611.

The scheduler 611 allocates the UL resources to the terminals through the scheduling by taking into account the amount of the UL resources requested by the CIDs provided from the message processor 609. Since the scheduler 611 can identify the terminal which requests the UL resources from the CID, the scheduler 611 allocates the UL resources per terminal. For instance, when it is possible to allocate the resources requested by the CIDs from the bandwidth request header, the scheduler 611 allocates the UL resources to the terminal of the CIDs through the scheduling by taking into account the UL resources requested by the CIDs.

By contrast, when it is infeasible to allocate the resources requested by the CIDs, the scheduler 611 checks whether it can allocate the resources to meet the minimum QoS of the CIDs.

When it is possible to allocate the resources to meet the minimum QoS of the CIDs, the scheduler 611 allocates the UL resources to the terminal through the scheduling by taking into account the resource amount to meet the minimum QoS of the CIDs. In doing so, as knowing the lacking resource amount of the terminal, the scheduler 611 can schedule the lacking resources to the terminal in a next scheduling period.

In contrast, when it is infeasible to allocate the resources to meet the minimum QoS of the CIDs, the scheduler 611 allocates the UL resources to the terminal so as to meet the minimum QoS of the CID of the highest priority amongst the CIDs. As knowing the lacking resource amount of the terminal, the scheduler 611 can schedule the lacking resources to the terminal in a next scheduling period.

Also, the scheduler 611 cancels the scheduled UL resource request period of the CIDs which request the UL resources using the bandwidth request header. The scheduler 611 cancels one next UL resource request period scheduled for the CIDs.

The message generator 613 generates UL MAP according to the UL resource information, which is provided from the scheduler 611, allocated to the terminals.

The encoder 615 encodes and modulates the signal output from the message generator 613 at the preset modulation level (MCS level).

The OFDM modulator 617 converts the frequency-domain signal output from the encoder 615 to a time-domain sample signal using the IFFT.

The DAC 619 converts the sample signal output from the OFDM modulator 617 to an analog signal.

The RF processor 621 converts the baseband signal output from the DAC 619 to an RF signal and transmits the RF signal over the antenna.

As constructed above, the scheduler 611, as a protocol controller, controls the message processor 609 and the message generator 613. Namely, the scheduler 611 can function as the message processor 609 and the message generator 613. They are provided individually to distinguish their functions. Hence, in the actual implementation, the scheduler 611 can process all or part of the message processor 609 and the message generator 611.

As set forth above, the CIDs are grouped to request the UL resources in the wireless communication system. Therefore, the overhead in the UL resource request can be mitigated by decreasing the number of times of the UL resource request, and the minimum QoS of the CIDs can be satisfied.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a terminal in a wireless communication system, the method comprising:
   identifying, by a scheduler in the terminal, a first connection identifier (CID) and a second CID that request uplink resources, and a sum of an amount of a first uplink resource for the first CID and an amount of a second uplink resource for the second CID;
grouping the first CID and the second CID as at least one group based on the terminal or a quality of service (QOS) class;
generating a first message associated with the grouped CIDs;
transmitting, to a base station, the first message comprising the sum of the amount of the first uplink resource and the amount of the second uplink resource and information indicating the first CID and the second CID; and
receiving a second message for allocating the first uplink resource and the second uplink resource;
wherein generating the first message comprises:
determining a size of a field indicative of the CIDs;
checking whether it is possible to represent resource requests of the grouped CIDs all in the field; and
when all of the resource requests of the grouped CIDs are represented in the field, generating the first message associated with the grouped CIDs.

2. The method of claim 1, wherein the information comprises the first CID.

3. The method of claim 1, wherein the first CID is identified by the first CID in the information, and
wherein the second CID is identified by a bitmap in the information.

4. The method of claim 1, wherein the field indicative of the grouped CIDs represents a resource request of the first CID or the first CID associated with the resource requests for the uplink resources among the grouped CIDs.

5. The method of claim 1, wherein generating the first message further comprises:
when it is infeasible to represent all the resource requests of the grouped CIDs in the field, grouping CIDs which are not represented in the field as a separate group or generating another message for each CID.

6. The method of claim 1, further comprising:
checking a bandwidth request period,
wherein, when a resource request period comes, the uplink resources associated with the CIDs are identified.

7. The method of claim 1, further comprising:
confirming resources allocated from the base station by using the second message; and
allocating uplink resources to the first CID and the second CID.

8. A method for operating a base station in a wireless communication system, the method comprising:
receiving, from a terminal, a first message comprising a sum of an amount of a first uplink resource for a first connection identifier (CID) and an amount of a second uplink resource for a second CID and information indicating the first CID and the second CID; and
transmitting a second message for allocating the first uplink resource and the second uplink resource to the terminal;
wherein the first CID and the second CID are grouped, by the terminal, as at least one group based on the terminal or a quality of service (QoS) class;
wherein the first message is associated with the grouped CIDs; and
wherein the first message is generated by determining a size of a field indicative of the CIDs, checking whether it is possible to represent resource requests of the grouped CIDs all in the field, and, when all of the resource requests of the grouped CIDs are represented in the field, generating the first message associated with the grouped CIDs.

9. The method of claim 8, wherein the information comprises the first CID.

10. The method of claim 8, further comprising:
identifying the first CID and the second CID that request the uplink resources; and
canceling a resource allocation for a next scheduled resource request of the identified CIDs.

11. The method of claim 8, wherein the first CID is identified by the first CID in the information, and
wherein the second CID is identified by a bitmap in the information.

12. A terminal in a wireless communication system, the terminal comprising:
a scheduler configured to identify a first connection identifier (CID) and a second CID that request uplink resources, and a sum of an amount of a first uplink resource for the first CID and an amount of a second uplink resource for the second CID;
a transmitter configured to transmit, to a base station, a first message comprising the sum of the amount of the first uplink resource and the amount of the second uplink resource and information indicating the first CID and the second CID; and
a receiver configured to receive a second message for allocating the first uplink resource and the second uplink resource;
wherein the scheduler comprises:
a grouping unit configured to group the first CID and the second CID as at least one group based on the terminal or a quality of service (QoS) class; and
a message generator configured to generate the first message which is associated with the grouped CIDs; and
wherein the message generator is configured to:
determine a size of a field indicative of the grouped CIDs;
determine whether it is possible to represent resource requests of all of the grouped CIDs in the field; and
generate the first message which is associated with the grouped CIDs when all of the resource requests of the grouped CIDs are represented in the field.

13. The terminal of claim 12, wherein the information comprises the first CID.

14. The terminal of claim 12, wherein the first CID is identified by the first CID in the information, and
wherein the second CID is identified by a bitmap in the information.

15. The terminal of claim 12, further comprising:
a message processor configured to check resources allocated from the base station, by using the second message,
wherein the scheduler is further configured to allocate uplink resources to the first CID and the second CID.

* * * * *